United States Patent
Tavares

(10) Patent No.: US 7,603,275 B2
(45) Date of Patent: Oct. 13, 2009

(54) SYSTEM, METHOD AND COMPUTER PROGRAM PRODUCT FOR VERIFYING AN IDENTITY USING VOICED TO UNVOICED CLASSIFIERS

(75) Inventor: Clifford Tavares, San Carlos, CA (US)

(73) Assignee: Hitachi, Ltd., Tokyo (JP)

( * ) Notice: Subject to any disclaimer, the term of this patent is extended or adjusted under 35 U.S.C. 154(b) by 893 days.

(21) Appl. No.: 11/264,280

(22) Filed: Oct. 31, 2005

(65) Prior Publication Data

US 2007/0100620 A1 May 3, 2007

(51) Int. Cl.
*G10L 17/00* (2006.01)

(52) U.S. Cl. .................. 704/250; 704/246; 704/273

(58) Field of Classification Search .............. 704/208, 704/214, 232, 245–250, 273
See application file for complete search history.

(56) References Cited

U.S. PATENT DOCUMENTS

| | | | |
|---|---|---|---|
| 4,058,676 A | 11/1977 | Wilkes et al. | |
| 5,522,012 A * | 5/1996 | Mammone et al. | 704/250 |
| 5,848,388 A | 12/1998 | Power et al. | |
| 6,058,364 A * | 5/2000 | Goldberg et al. | 704/252 |
| 6,311,272 B1 * | 10/2001 | Gressel | 713/186 |
| 6,401,063 B1 * | 6/2002 | Hebert et al. | 704/234 |
| 6,567,765 B1 * | 5/2003 | Wu et al. | 702/182 |
| 6,577,997 B1 * | 6/2003 | Gong | 704/252 |
| 7,409,343 B2 * | 8/2008 | Charlet | 704/246 |
| 7,487,089 B2 * | 2/2009 | Mozer | 704/246 |
| 2002/0095287 A1 * | 7/2002 | Botterweck | 704/250 |
| 2002/0156620 A1 * | 10/2002 | Heikkinen et al. | 704/214 |
| 2003/0055634 A1 | 3/2003 | Hidaka et al. | |
| 2004/0107099 A1 * | 6/2004 | Charlet | 704/234 |
| 2004/0128130 A1 | 7/2004 | Rose et al. | |
| 2005/0033573 A1 * | 2/2005 | Hong et al. | 704/250 |
| 2005/0055214 A1 * | 3/2005 | Kirovski et al. | 704/273 |
| 2005/0060153 A1 | 3/2005 | Gable et al. | |

(Continued)

OTHER PUBLICATIONS

Tomohiro Nakatani et al., Dominance Spectrum Based V/UV Classification and FO Estimation, Proc. Of EUROSPEECH-2003, Sep. 2003, pp. 2313-2316.

(Continued)

*Primary Examiner*—Talivaldis I Smits
*Assistant Examiner*—Douglas C Godbold
(74) *Attorney, Agent, or Firm*—Squire, Sanders & Dempsey, L.L.P.

(57) ABSTRACT

Embodiments of a system, method and computer program product for verifying an identity claimed by a claimant using voiced to unvoiced classifiers are described. In accordance with one embodiment, a speech sample from a claimant claiming an identity may be captured. From the speech sample, a ratio of unvoiced frames to a total number of frames in the speech sample may be calculated. An equal error rate value corresponding to the speech sample can then be determined based on the calculated ratio. The determined equal error rate value corresponding to the speech sample may be compared to an equal error rate value associated with the claimed identity in order to select a decision threshold. A match score may be also be generated based on a comparison of the speech sample to a voice sample associated with the claimed identity. A decision whether to accept the identity claim of the claimant can then be made based on a comparison of the match score to the decision threshold.

20 Claims, 5 Drawing Sheets

U.S. PATENT DOCUMENTS

2006/0222210 A1* 10/2006 Sundaram .................. 382/115
2007/0129941 A1* 6/2007 Tavares ...................... 704/226

OTHER PUBLICATIONS

Jingdong Chen et al., "Cepstrum Derived from Differentiated Power Spectrum for Robust Speech Recognition," Speech Communication, Oct. 2003, pp. 469-484, vol. 41, Issues 2-3, Elsevier B.V.

Frederic Bimbot et al., "A Tutorial on Text-Independent Speaker Verificaiton," EURASIP Journal on Applied Signal Processing 2004, Apr. 1, 2004, pp. 430-451, vol. 4, Hindawi Publishing Corporation.

Fifth Generation Computer Corporation, "Speaker Independent Connected Speech Recognition," http://www.fifthgen.com/speaker-independent-connected-s-r.htm, Jun. 21, 2005, 17 pages.

* cited by examiner

SYSTEM, METHOD AND COMPUTER PROGRAM PRODUCT FOR VERIFYING AN IDENTITY USING VOICED TO UNVOICED CLASSIFIERS

TECHNICAL FIELD

Embodiments described herein relate generally to speech recognition and more particularly relate to speaker verification.

BACKGROUND

Biometrics is the science and technology of measuring and statistically analyzing biological data. A biometric is a measurable, physical characteristic or personal behavioral trait used to recognize the identity, or verify the claimed identity, of an enrollee. In general, biometrics statistically measure certain human anatomical and physiological traits that are unique to an individual. Examples of biometrics include fingerprints, retinal scans, hand recognition, signature recognition, and speaker recognition.

Verification (also known as authentication) is a process of verifying the user is who they claim to be. A goal of verification is to determine if the user is the authentic enrolled user or an impostor. Generally, verification includes four stages: capturing input; filtering unwanted input such as noise; transforming the input to extract a set of feature vectors; generating a statistical representation of the feature vector; and performing a comparison against information previously gathered during an enrollment procedure.

Speaker verification systems (also known as voice verification systems) attempt to match the voice of a speaker whose identity is undergoing verification with a known voice. Speaker verification systems help to provide a means for ensuring secure access by using speech utterances. Verbal submission of a word or phrase or simply a sample of an individual speaker's speaking of a randomly selected word or phrase are provided by a claimant when seeking access to pass through a speaker recognition and/or speaker verification system. An authentic claimant is one whose utterance matches known characteristics associated with the claimed identity.

To train a speaker verification system, a claimant typically provides a speech sample or speech utterance that is scored against a model corresponding to the claimant's claimed identity and a claimant score is then computed to confirm that the claimant is in fact the claimed identity.

SUMMARY

Embodiments of a system, method and computer program product for verifying an identity claimed by a claimant using voiced to unvoiced classifiers are described. In accordance with one embodiment, a speech sample from a claimant claiming an identity may be captured. From the speech sample, a ratio of unvoiced frames to a total number of frames in the speech sample may be calculated. An equal error rate value corresponding to the speech sample can then be determined based on the calculated ratio. The determined equal error rate value corresponding to the speech sample may be compared to an equal error rate value associated with the claimed identity in order to select a decision threshold. A match score may be also be generated based on a comparison of the speech sample to a voice sample associated with the claimed identity. A decision whether to accept the identity claim of the claimant can then be made based on a comparison of the match score to the decision threshold.

In one embodiment, the speech sample may be processed at least to identify voiced and unvoiced frames in the speech sample before the calculating of the ratio. In another embodiment, the determination of the equal error rate value corresponding to the speech sample may include using a function that describes a relationship between equal error rate values and ratios of unvoiced frames to a total number of frames in a population. In a further embodiment, the equal error rate value associated with the claimed identity can be based on a ratio of unvoiced frames to a total number of frames in the voice sample associated with the claimed identity and the function that describes a relationship between equal error rate values and ratios of unvoiced frames to the total number of frames in the population.

In one embodiment, the match score may be modified with a penalty prior to deciding whether to accept the identity claim. In such an embodiment, the penalty can be based on a standard deviation associated with the voice sample of the claimed identity. The penalty may be based on a difference between a standard deviation associated with the voice sample of the claimed identity and a ratio of unvoiced frames to the total number of frames in the voice sample associated with the claimed identity. The standard deviation associated with the voice sample of the claimed identity may be based on the ratio of unvoiced frames to the total number of frames in the voice sample associated with the claimed identity and a function that describes a relationship between standard deviations and ratios of unvoiced frames to the total number of frames in a population. The standard deviation and the ratio of unvoiced frames to the total number of frames in the voice sample associated with the claimed identity can also be stored with the voice sample of the identity.

In one embodiment, if the equal error rate value corresponding to the speech sample is selected as the decision threshold, then a standard deviation of the determined ratio of unvoiced frames for the speech sample can be calculated. This standard deviation associated with the speech sample may be based on the ratio of unvoiced frames to the total number of frames in the speech sample and a function that describes a relationship between standard deviations and ratios of unvoiced frames to the total number of frames in a population.

DETAILED DESCRIPTION

Embodiments described herein help to provide a very low complexity method for improving speaker recognition accuracy through the use of voiced-unvoiced classifiers.

Threshold setting may be important for the correct operation of a voice-based biometric system. Embodiments described herein may help to all for the computation of a threshold or separation distance that corresponds to the best equal error rate for a given speaker. The ratio of voiced to unvoiced frames may be used as a consistent metric for a given speaker and utterance. A penalty may be assigned based on differences in this ratio between enrollment and verification sessions thereby helping to increase the discriminating ability of the speaker verification algorithm. Voiced to unvoiced ratio difference cutoff thresholds may also be used in the rejection of spurious recorded samples, or the rejection of invalid speakers. When a large voiced to unvoiced ratio differences is detected, a standard speaker verification process (e.g., cepstrum-based) may be bypassed to help reduce computation time.

The ratio of voiced to unvoiced frames has been found to be a consistent metric for a given speaker and utterance. Embodiments of a voiced to unvoiced classifier are described herein that can be used for separation of the two frame types. This classification ratio can be used when determining an optimum separation threshold (EER point) between valid users and imposters. The difference in this ratio between enrollment and verification voice samples can also be used to assign a penalty to help improve the overall recognition accuracy.

Voiced to unvoiced classifiers can be used to improve the performance of speaker recognition systems in one or more of the following ways. First, voiced to unvoiced classifiers may be used to help the automatic computation of the best separation distance (corresponding to the equal error rate). Second voiced to unvoiced classifiers may be used to assign penalties based on the differences in the ratio of voiced to unvoiced frames between enrollment and verification. Third, the voiced to unvoiced ratio difference cutoff thresholds may also be used in the rejection of spurious recorded samples and/or the rejection of invalid speakers.

Architecture

Figure 1:
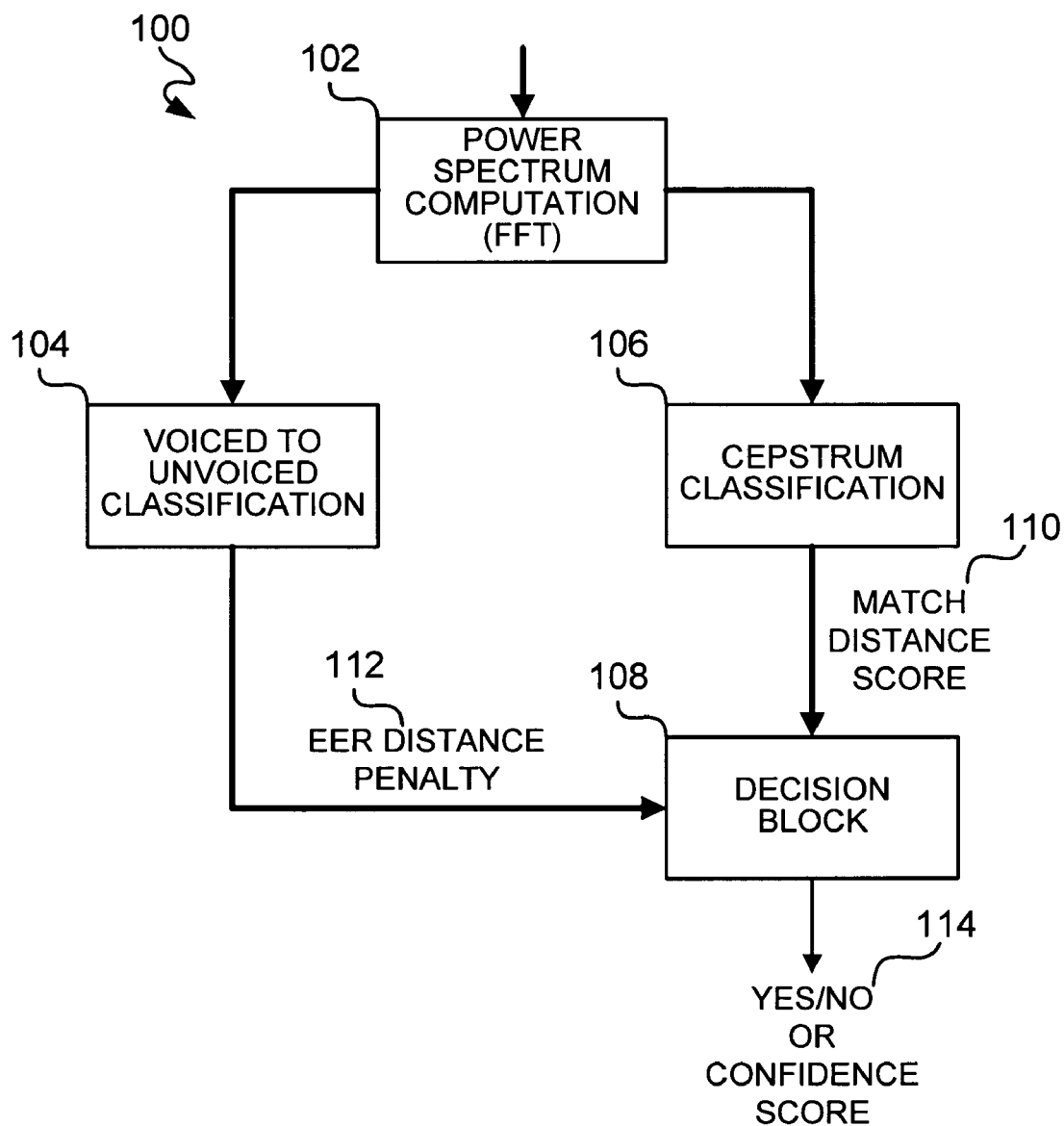
FIG. 1 is a schematic block diagram of an exemplary architecture for a speaker recognition system capable of using voiced to unvoiced classifiers in accordance with one embodiment.

FIG. 1 is a schematic block diagram of an exemplary architecture for a speaker recognition system 100 capable of using voiced to unvoiced classifiers in accordance with one embodiment.

In the speaker recognition system 100, voice biometric input from a claimant may be captured as speech data. The captured speech data may be passed to a component 102 that computes a power spectrum from the captured speech data using, for example, a Fourier Transform or a Fast Fourier Transform (FFT).

The captured speech data can be processed before being passed to power spectrum computing component 102. For example, the captured speech data can be filtered and passed through a speech pre-emphasis filter. The speech data can also be subjected to voice activity detection (VAD) and/or a word spotting algorithm(s) (such as e.g., probability ratio word spotting techniques, a posteriori probability word spotting methods, and N best word spotting methods). The speech data can be further processed by framing, hamming windows and so on. One result of the processing of the speech data is the identification of voiced and unvoiced frames in the speech data. Further details of various processing procedures and methods are described in U.S. Patent Publication No. 2004/0128130 A1 entitled "Perceptual harmonic cepstral coefficients as the front-end for speech recognition" by inventors Kenneth Rose et al., published Jul. 1, 2004, and which is incorporated by reference herein in its entirety. Further ways of characterizing speech are described in U.S. Patent Publication No. 2005/0060153 A1 entitled, "Method and apparatus for speech characterization" by inventors Todd J. Gable et al., published Mar. 17, 2005, and which is also incorporated by reference herein in its entirety.

The speaker recognition system 100 may also include a voiced to unvoiced classification component A104 and a cepstrum classification component 106. The computed power spectrum output by power spectrum computing component 102 may be used by the voiced to unvoiced classification component A104 for computing voiced to unvoiced metrics and outputting an equal error rate (EER) distance penalty. The computed power spectrum output by power spectrum computing component 102 may also be used by the cepstrum classification component 106 for computing cepstrum features and outputting a match distance score.

The speaker recognition system 100 may further include a decision making component 108 that can use the output match distance score 110 and EER distance penalty 112 to output a decision score 114 (e.g., an accept/reject score and/or a confidence score) that can be used to determine whether to accept or reject the claimant's claim of identity based on the voice biometric input. The decision making component 108 may use the EER distance penalty 112 to modify the match distance score 110 and then compare the modified match distance score to a decision threshold in order to derive the decision score 114.

Voiced Unvoiced Decision

Generally speaking, voiced segments or frames of a speech sample are typically associated with high local energy and often exhibit a distinct periodicity corresponding to the fundamental frequency, or equivalently pitch, of the speech signal. For example, voiced sounds such as 'aah' or 'oh' are produced when the vocal cords are tensed together and vibrate as the air pressure builds up, forcing the glottis open, and then subsides as the air passes through. This vibration has a frequency spectrum rich in harmonics at multiples of the fundamental frequency (i.e., pitch). Speakers vary pitch with air pressure in the lungs and tension on the vocal cords.

Unvoiced segments of frames often have a resemblance similar to noise. Unvoiced sounds may be fricative or aspirated. Vocal cords do not vibrate for either. Fricative sounds such as 's' or 'sh' are generated at some point in the vocal tract. As air is forced past it turbulence occurs causing a random noise. Since the points of constriction tend to occur near the front of the mouth, the resonances of the vocal tract have little effect on sound being produced. In aspirated sounds, such as 'h' of 'hello'. turbulent airflow occurs at the glottis as the vocal cords are held slightly apart. Resonances of the vocal tract modulate the spectrum of the random noise as heard in whispered speech. Plosive sounds, such as the 'puh' sound at the beginning of the word 'pin' or the 'duh' sound at the beginning of 'din', are created when the vocal tract is closed at some point, allowing air pressure to build up before it is suddenly released. This transient excitation may occur with or without vocal cord vibration.

Speech signal may also contain segments, which can be classified as a mixture of voiced and unvoiced speech where both components are present simultaneously. This category includes voiced fricatives and breathy and creaky voices. The appropriate classification of mixed segments as either voiced or unvoiced may depend on the properties of the speech codec used in a given implementation.

In order to identify whether a given frame of captured speech data is a voiced or unvoiced frame, a voiced unvoiced decision may be computed. An illustrative embodiment of a voiced to unvoiced decision may be computed using the following exemplary pseudo code:

```
for every frame in voice sample
    [maxVal, index_of_maxVal] = max(array_power_spectrum);
    index_of_maxVal = index_of_maxVal * ((SamplingFreq/2) /
length(array_power_spectrum));
    if (index_of_maxVal>(SamplingFreq/4))
        unvoiced=1;
    else
        voiced=1;
    end
end
```

In this pseudo code, if "unvoiced=1," then the frame is designated as an unvoiced frame. If "voiced=1," then the frame is designated as a voiced frame.

Additional processes for determining voiced and unvoiced frames is described in U.S. Patent Publication No. 2002/0156620 A1 entitled, "Method and apparatus for speech coding with voiced/unvoiced determination" by inventors Ari Heikkinen et al., published Oct. 24, 2004, and which is incorporated by reference herein in its entirety.

Offline Training Process

A training process for a speaker verification system that uses voiced to unvoiced classifiers is as follows. This training process may be conducted offline.

Figure 2:
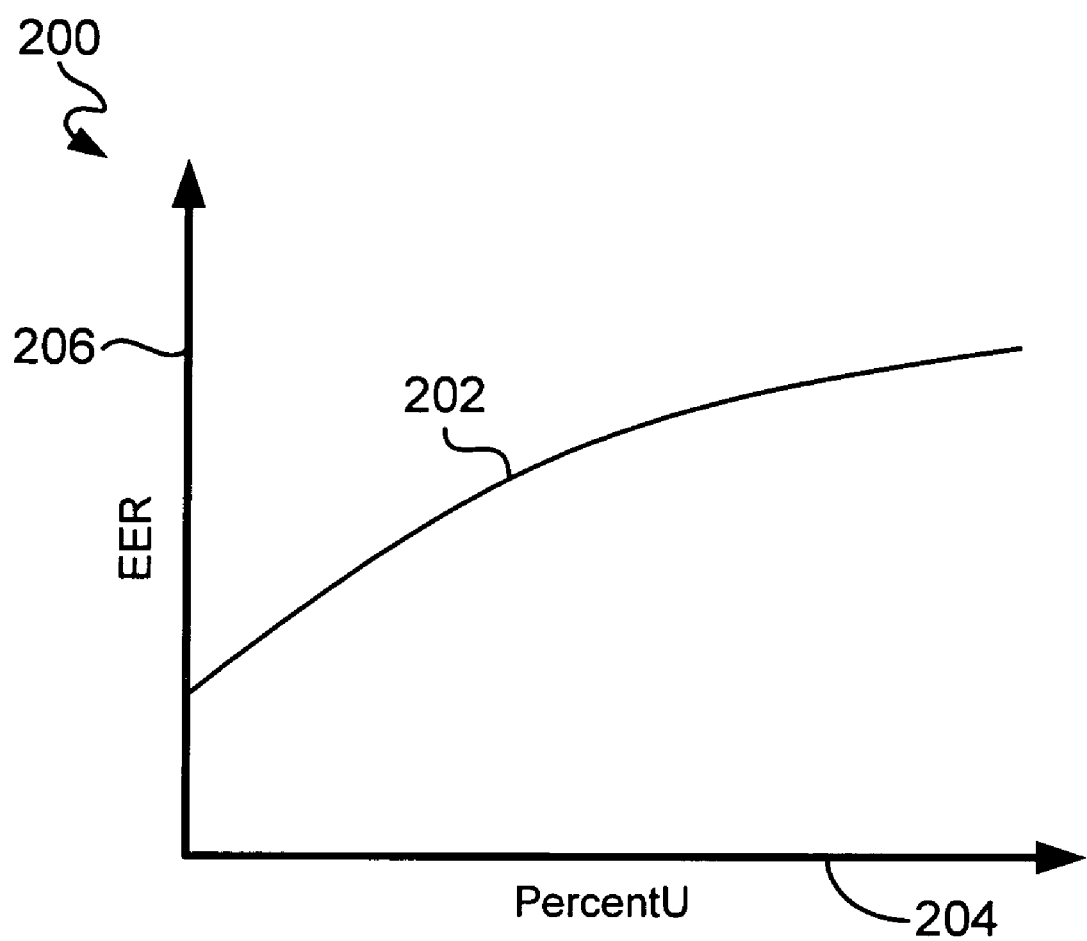
FIG. 2 is a graph of an exemplary unvoiced lookup transfer function ("ulookup") in accordance with an illustrative embodiment.

In the training process, statistics of voiced and unvoiced frames may be obtained from a large database of utterances to be used for speaker recognition. These statistics can include a count (i.e., the number) of unvoiced frame represented as a percent ("PercentU") of the total number of voiced and unvoiced frames in a given utterance. The set of utterances may also be divided into a number of bins so that each bin contains utterances from an (approximately) equal numbers of users. For each bin, the PercentU may be plotted against the equal error rate (EER) to generate a graph of an unvoiced lookup transfer function referred to as. "ulookup." FIG. 2 is a graph 200 of an exemplary unvoiced lookup transfer function 202 ("ulookup") in accordance with an illustrative embodiment. The ulookup transfer function 202 maps the percentage of unvoiced frames ("PercentU") 204 set forth along the x-axis of the graph, versus equal error rate (EER) values 206 set forth along the y-axis of the graph.

Figure 3:
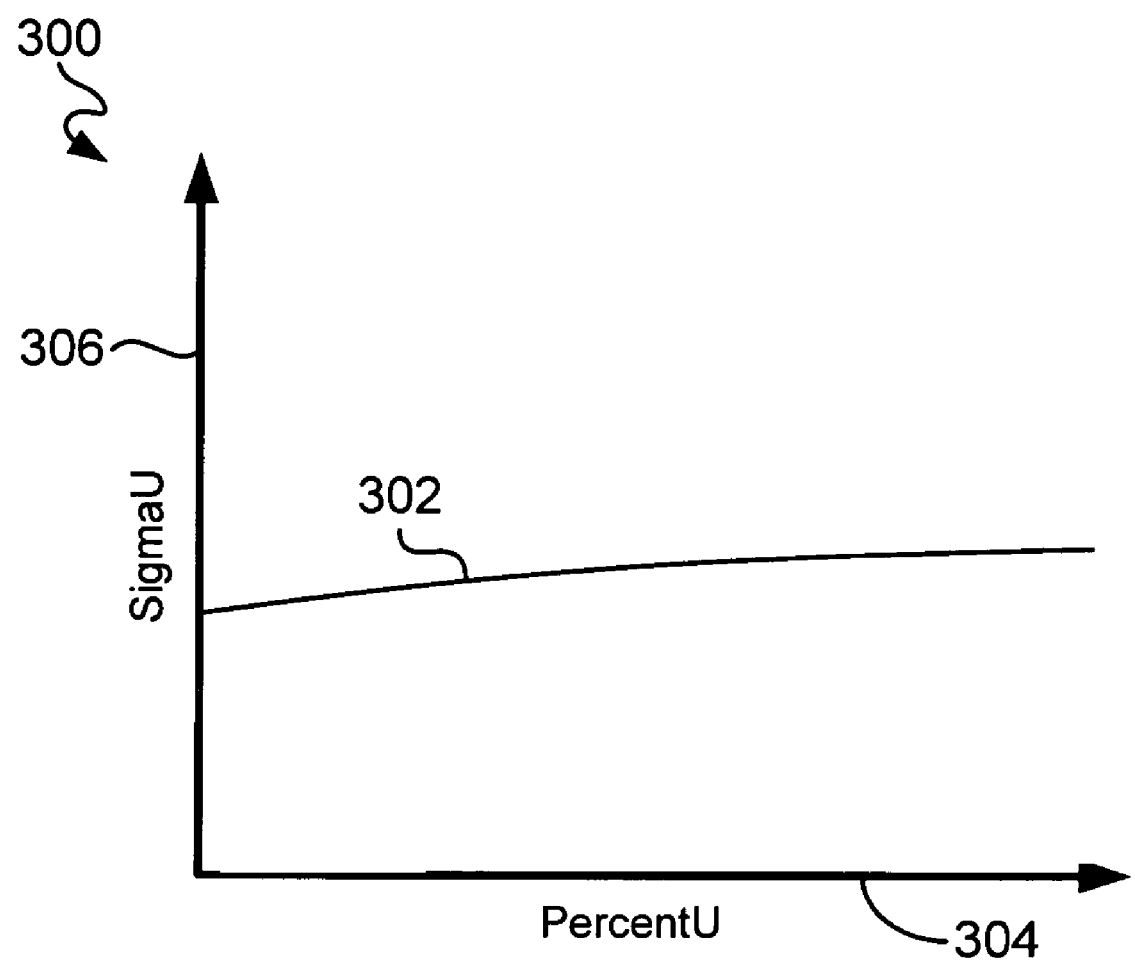
FIG. 3 is a graph of a exemplary standard deviation lookup transfer function ("sigLookup") in accordance with an illustrative embodiment.

The PercentU for valid user voices may be plotted against the standard deviation ("SigmaU") of the PercentU to generate a graph of standard deviation lookup transfer function referred to as "sigLookup." FIG. 3 is a graph 300 of a exemplary standard deviation lookup transfer function 302 ("sigLookup") in accordance with an illustrative embodiment. The sigLookup transfer function 302 maps the percentage of unvoiced frames ("PercentU") 304 along the x-axis versus, along the y-axis, the standard deviation ("SigmaU") 306 for valid user voices. The equal error rate (EER), also known as the crossover rate or crossover error rate, may be defined as a point where decision threshold of a biometric system can be set so that the proportion of false rejections will be approximately equal to the proportion of false acceptances decision threshold of a verification system can be set so that with where. Typically, the lower the equal error rate value, the higher the accuracy of the biometric system.

Enrollment Process

Enrollment of a user (i.e., an "enrollee") into a speaker verification system using voiced to unvoiced classifiers may be conducted as follows. For each enrollee, the count of unvoiced frames as a percentage ("PercentU") of the total number of voiced and unvoiced frames in an utterance made by the enrollee. In addition, the variance ("SigmaU") of the PercentU across enrollment utterances may be computed for each enrollee. This data, the PercentU and SigmaU, may then be stored with a voice sample of the utterance made by the enrollee.

Verification Process

Verification of a user (i.e., a "claimant") may be carried out according to the following process. This process may be carried out, for example, utilizing the architecture shown in FIG. 1. From a captured utterance made by the claimant, a count of the unvoiced frames may be computed as a percentage of unvoiced frames to the total number of voiced and unvoiced frames in the utterance. This percentage may be referred to as the "newPercentU." From the newPercentU, the variance of the newPercentU across enrollment utterances may be computed. This variance may be referred to as the "newVarU."

The PercentU and SigmaU of the voice sample of the identity (i.e., the enrollee) claimed by the claimant may be loaded. From the loaded PercentU, an equal error rate distance for the identity ("enrEERDist") may be determined from the unvoiced lookup transfer function, ulookup (e.g., enrEERDist=ulookup(PercentU)). Similarly, ulookup may be utilized to determine an equal error rate distance for the claimaint ("newEERDist") from the claimant's newPercentU (of the claimaint(e.g., newEERDist=ulookup(newPercentU)).

With the determined enrEERDist and newEERDist, the distance for the equal error rate may be computed using the following exemplary pseudocode:

```
if (enrEERDist < newEERDist)
    EERDist = enrEERDist
else
    EERDist = newEERDist
```

A penalty may also be computed using the difference between the variance, SigmaU, and the PercentU (e.g., penalty=ComputeError(SigmaU-PercentU)).

Figure 4:
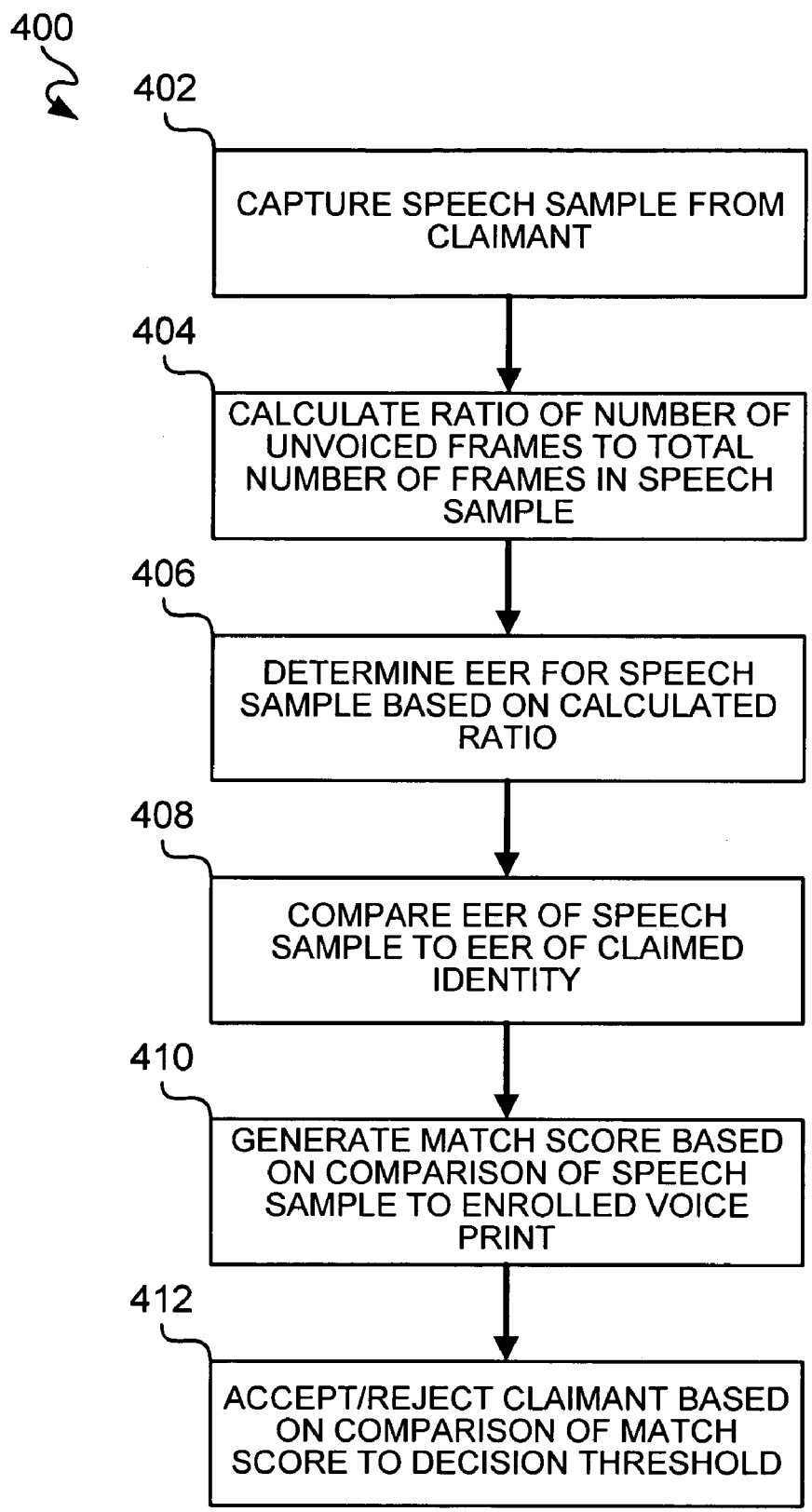
FIG. 4 is a flowchart of a process of verifying an identity claimed by a claimant using voiced to unvoiced classifiers in accordance with one embodiment.

FIG. 4 is a flowchart of a process 400 of verifying an identity claimed by a claimant using voiced to unvoiced classifiers in accordance with one embodiment. Operations 402-412 described hereafter can be implemented, for example, using one or more computer implemented components. In operation 402, a sample of speech (such as, e.g., an utterance) can be captured (using, for example, an audio pick up device that includes a microphone) from a claimant that claims an identity of an enrollee in a biometric verification system. For purposes of at least some embodiments described herein, an utterance or speech sample may comprise isolated words or phrases and may also be connector or continuous speech. In operation 404, a ratio (e.g., a percentage) of unvoiced frames to a total number of frames (comprising both voiced and unvoiced frames) in the sample of speech (hereinafter referred to as the "speech sample") may be calculated. In operation 406, an equal error rate value (i.e., distance) may be calculated for the speech sample based on the ratio calculated in operation 404. In operation 408, the determined equal error rate value corresponding to the speech sample may be compared to an equal error rate value (i.e., distance) known to be associated with the claimed identity in order to select one of the equal error rate values as a decision threshold for the claimant. In operation 410, a match score for the claimant may be generated based on a comparison of the speech sample to a voice sample known to be associated with the claimed identity (i.e., the voice sample obtained during enrollment of the enrollee). In operation 412, a decision may be made as to whether to accept or reject the identity claim of the claimant based on a comparison of the generated match score to the decision threshold. In an embodiment where the larger match score, the greater the dissimilarity, the identity claim can be rejected if the match score exceeds the decision threshold. Alternatively, in another embodiment where the smaller match score, the greater the dissimilarity, the identity claim can be rejected if the match score is less than the decision threshold.

Before the calculating of the ratio in operation 404, the speech sample can be processed at least to identify voiced and unvoiced frames in the speech sample. This processing can include the use of a VAD and/or a word spotting algorithm for example.

The determining of the equal error rate value corresponding to the speech sample in operation 406 may involve using a function (e.g., a ulookup transfer function) that describes (or defines) a relationship between equal error rate values (or distances) and ratios (i.e., percentages) of unvoiced frames to a total number of frames in a population-of utterances. The equal error rate value associated with the claimed identity can be based on a ratio(e.g., a percentage) of unvoiced frames to a total number of frames in the voice sample associated with the claimed identity and the ulookup transfer function that describes a relationship between equal error rate values/distances and ratios/percentages of unvoiced frames to a total number of frames in a population of utterances.

Prior to deciding whether to accept the identity claim, the match score may be modified with a penalty. This penalty can based on a standard deviation or variance associated with the voice sample of the claimed identity. For example, this penalty can be based on a difference between a standard deviation/variance associated with the voice sample of the claimed identity and a ratio of unvoiced frames to the total number of frames in the voice sample associated with the claimed identity. In such an implementation, the standard deviation/variance associated with the voice sample of the claimed identity may be based on the ratio of unvoiced frames to the total number of frames in the voice sample associated with the claimed identity and a function (e.g., a sigLookup transfer function) that describes a relationship between standard deviations/variances/and ratios/percentages of unvoiced frames to the total number of frames in a population of utterances (such as, e.g., a population of valid user utterances (i.e., a population of enrollment utterances)). As an option, the standard deviation/variance and the ratio of unvoiced frames to the total number of frames in the voice sample associated with the claimed identity can be stored with the voice sample of the identity in a database residing, for example, in a memory device.

If, in operation 408, the equal error rate value corresponding to the speech sample is selected as the decision threshold, then the standard deviation/variance of the determined ratio of unvoiced frames across enrollment utterances for the speech sample can be calculated. The standard deviation/variance associated with the speech sample may be based on the ratio of unvoiced frames to the total number of frames in the speech sample and a sigLookup transfer function that describes a relationship between standard deviations/variances and ratios/percentages of unvoiced frames to the total number of frames in a population of utterances (such as, e.g., a population of valid user utterances (i.e., a population of enrollment utterances)).

Figure 5:
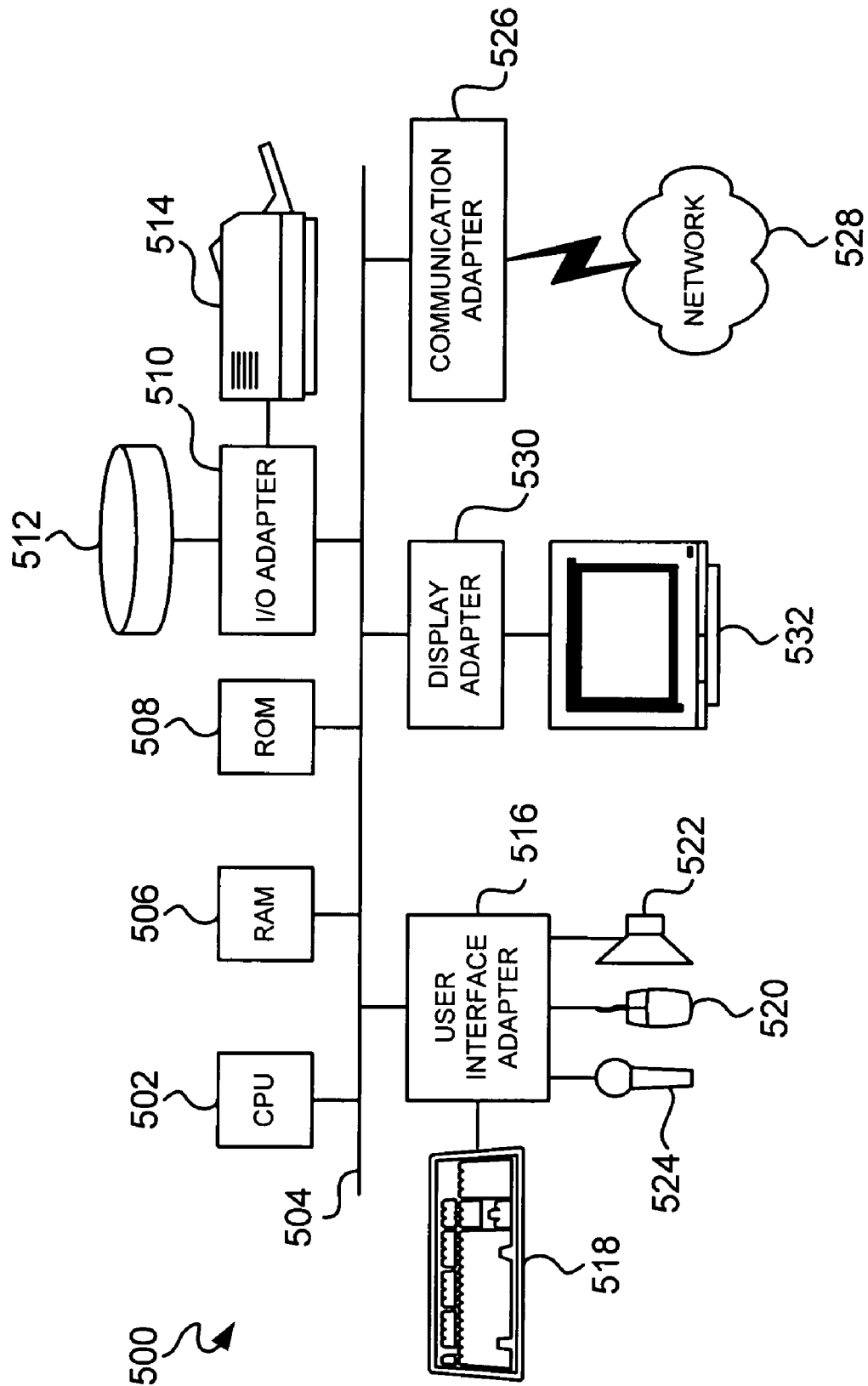
FIG. 5 is a schematic diagram of a representative hardware environment in accordance with one embodiment.

FIG. 5 illustrates an exemplary hardware configuration of a computer 500 having a central processing unit 502, such as a microprocessor, and a number of other units interconnected via a system bus 504. The computer 500 shown in FIG. 5 includes a Random Access Memory (RAM) 506, Read Only Memory (ROM) 508, an I/O adapter 510 for connecting peripheral devices such as, for example, disk storage units 512 and printers 514 to the bus 504, a user interface adapter 516 for connecting various user interface devices such as, for example, a keyboard 518, a mouse 520, a speaker 522, a microphone 524, and/or other user interface devices such as a touch screen or a digital camera to the bus 504, a communication adapter 526 for connecting the computer 500 to a communication network 528 (e.g., a data processing network) and a display adapter 530 for connecting the bus 504 to a display device 532. The computer may utilize an operating, system such as, for example, a Microsoft Windows operating system (O/S), a Macintosh O/S, a Linux O/S and/or a UNIX O/S. Those of ordinary skill in the art will appreciate that embodiments may also be implemented on platforms and operating systems other than those mentioned. One of ordinary skilled in the art will also be able to combine software with appropriate general purpose or special purpose computer hardware to create a computer system or computer sub-system for implementing various embodiments described herein.

Embodiments may also be implemented using computer program languages such as, for example, ActiveX, Java, C, and the C++ language and utilize object oriented programming methodology. Any such resulting program, having computer-readable code, may be embodied or provided within one or more computer-readable media, thereby making a computer program product (i.e., an article of manufacture). The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

Based on the foregoing specification, various embodiments may be implemented using computer programming or engineering techniques including computer software, firmware, hardware or any combination or subset thereof. Any such resulting program—having computer-readable code—may be embodied or provided in one or more computer-readable media, thereby making a computer program product (i.e., an article, of manufacture) implementation of one or more embodiments described herein. The computer readable media may be, for instance, a fixed drive (e.g., a hard drive), diskette, optical disk, magnetic tape, semiconductor memory such as for example, read-only memory (ROM), flash-type memory, etc., and/or any transmitting/receiving medium such as the Internet and/or other communication network or link. An article of manufacture containing the computer code may be made and/or used by executing the code directly from one medium, by copying the code from one medium to another medium, and/or by transmitting the code over a network. In addition, one of ordinary skill in the art of computer science may be able to combine the software created as described with appropriate general purpose or special purpose computer hardware to create a computer system or computer sub-system embodying embodiments or portions thereof described herein.

The following additional -references are hereby incorporated by reference herein: Nakatani, T., Irino, T., and Zolfaghari, P.S., "Dominance spectrum based V/UV classification and F0 estimation," Proc. of EUROSPEECH-2003, pp. 2313-2316, September, 2003; Jingdong Chen, Kuldip K. Paliwal, Satoshi Nakamura, "Cepstrum derived from differentiated power spectrum for robust speech recognition", Speech Communication, Vol. 41, Issues 2-3 (2003), pp. 469-484, October 2003; and F. Bimbot, J. F. Bonastre et al., "A tutorial on text-independent speaker verification," 2004 EURASIP Journal on Applied Signal Processing (JASP) 2004:4 (2004), pp. 430-451, Apr. 1, 2004.

While various embodiments have been described, they have been presented by way of example only, and not limitation. Thus, the breadth and scope of any embodiment should not be limited by any of the above described exemplary embodiments, but should be defined only in accordance with the following claims and their equivalents.

What is claimed:

1. A method, comprising:
   using an audio pick up device to capture a speech sample from a claimant claiming an identity; and
   using computer software embodied on a computer readable medium to perform the following steps:
   calculating a ratio of unvoiced frames to a total number of frames in the speech sample,
   determining an equal error rate value corresponding to the speech sample based on the calculated ratio,
   comparing the determined equal error rate value corresponding to the speech sample to an equal error rate value associated with the claimed identity to select a decision threshold,
   generating a match score based on a comparison of the speech sample to a voice sample associated with the claimed identity, and
   deciding whether to accept the identity claim of the claimant based on a comparison of the match score to the decision threshold.

2. The method of claim 1, wherein the speech sample is processed at least to identify voiced and unvoiced frames in the speech sample before the calculating of the ratio.

3. The method of claim 1, wherein the determining of the equal error rate value corresponding to the speech sample includes using a function that describes a relationship between equal error rate values and ratios of unvoiced frames to a total number of frames in a population.

4. The method of claim 1, wherein the equal error rate value associated with the claimed identity is based on a ratio of unvoiced frames to a total number of frames in the voice sample associated with the claimed identity and the function that describes a relationship between equal error rate values and ratios of unvoiced frames to a total number of frames in a population.

5. The method of claim 1, wherein the match score is modified with a penalty prior to deciding whether to accept the identity claim.

6. The method of claim 5, wherein the penalty is based on a standard deviation associated with the voice sample of the claimed identity.

7. The method of claim 5, wherein the penalty is based on a difference between a standard deviation associated with the voice sample of the claimed identity and a ratio of unvoiced frames to the total number of frames in the voice sample associated with the claimed identity.

8. The method of claim 7, wherein the standard deviation associated with the voice sample of the claimed identity is based on the ratio of unvoiced frames to the total number of frames in the voice sample associated with the claimed identity and a function that describes a relationship between standard deviations and ratios of unvoiced frames to the total number of frames in a population.

9. The method of claim 7, wherein the standard deviation and the ratio of unvoiced frames to the total number of frames in the voice sample associated with the claimed identity are stored with the voice sample of the identity.

10. The method of claim 1, wherein if the equal error rate value corresponding to the speech sample is selected as the decision threshold, calculating a standard deviation of the determined ratio of unvoiced frames for the speech sample.

11. The method of claim 10, wherein the standard deviation associated with the speech sample is based on the ratio of unvoiced frames to the total number of frames in the speech sample and a function that describes a relationship between standard deviations and ratios of unvoiced frames to the total number of frames in a population.

12. A system, comprising:
   an audio pick up device for capturing a speech sample from a claimant claiming a computer readable medium; and
   a central processing unit interacting with the computer readable medium to perform the following steps:
   a component, implemented in a computer, capable of:
   calculating a ratio of unvoiced frames to a total number of frames in the speech sample,
   determining an equal error rate value corresponding to the speech sample based on the calculated ratio,
   comparing the determined equal error rate value corresponding to the speech sample to an equal error rate value associated with the claimed identity to select a decision threshold,
   generating a match score based on a comparison of the speech sample to a voice sample associated with the claimed identity, and
   deciding whether to accept the identity claim of the claimant based on a comparison of the match score to the decision threshold.

13. The system of claim 12, wherein the determining of the equal error rate value corresponding to the speech sample includes using a function that describes a relationship between equal error rate values and ratios of unvoiced frames to a total number of frames in a population.

14. The system of claim 12, wherein the equal error rate value associated with the claimed identity is based on a ratio of unvoiced frames to a total number of frames in the voice sample associated with the claimed identity and the function that describes a relationship between equal error rate values and ratios of unvoiced frames to a total number of frames in a population.

15. The system of claim 12, wherein the match score is modified with a penalty prior to deciding whether to accept the identity claim.

16. The system of claim 15, wherein the penalty is based on a difference between a standard deviation associated with the voice sample of the claimed identity and a ratio of unvoiced frames to the total number of frames in the voice sample associated with the claimed identity.

17. The system of claim 16, wherein the standard deviation associated with the voice sample of the claimed identity is based on the ratio of unvoiced frames to the total number of frames in the voice sample associated with the claimed identity and a function that describes a relationship between standard deviations and ratios of unvoiced frames to the total number of frames in a population.

18. The system of claim 17, wherein the standard deviation and the ratio of unvoiced frames to the total number of frames in the voice sample associated with the claimed identity are stored with the voice sample of the identity in a database residing in a memory device.

19. The system of claim 12, wherein if the equal error rate value corresponding to the speech sample is selected as the decision threshold, calculating a standard deviation of the determined ratio of unvoiced frames for the speech sample based on the ratio of unvoiced frames to the total number of frames in the speech sample and a function that describes a relationship between standard deviations and ratios of unvoiced frames to the total number of frames in a population.

20. A computer readable medium encoded with computer code that performs the following steps:
   capturing a speech sample from a claimant claiming an identity;
   calculating a ratio of unvoiced frames to a total number of frames in the speech sample;
   determining an equal error rate value corresponding to the speech sample based on the calculated ratio;
   comparing the determined equal error rate value corresponding to the speech sample to an equal error rate value associated with the claimed identity to select a decision threshold;
   generating a match score based on a comparison of the speech sample to a voice sample associated with the claimed identity; and
   deciding whether to accept the identity claim of the claimant based on a comparison of the match score to the decision threshold.

* * * * *